US008949666B2

(12) United States Patent
Reddi et al.

(10) Patent No.: US 8,949,666 B2
(45) Date of Patent: Feb. 3, 2015

(54) ADAPTIVE EVENT-GUIDED SYSTEM AND METHOD FOR AVOIDING VOLTAGE EMERGENCIES

(75) Inventors: Vijay Janapa Reddi, Cambridge, MA (US); Meeta Sharma Gupta, Boston, MA (US); Glenn Holloway, Cambridge, MA (US); Gu-Yeon Wei, Cambridge, MA (US); Michael D. Smith, Cambridge, MA (US); David Brooks, Cambridge, MA (US)

(73) Assignee: President and Fellows of Harvard College, Cambridge, MA (US)

( * ) Notice: Subject to any disclaimer, the term of this patent is extended or adjusted under 35 U.S.C. 154(b) by 658 days.

(21) Appl. No.: 13/201,110

(22) PCT Filed: Feb. 11, 2010

(86) PCT No.: PCT/US2010/023829
§ 371 (c)(1),
(2), (4) Date: Sep. 20, 2011

(87) PCT Pub. No.: WO2010/093750
PCT Pub. Date: Aug. 19, 2010

(65) Prior Publication Data
US 2012/0005515 A1  Jan. 5, 2012

Related U.S. Application Data

(60) Provisional application No. 61/151,936, filed on Feb. 12, 2009.

(51) Int. Cl.
*G06F 11/00* (2006.01)
*G06F 1/28* (2006.01)

(52) U.S. Cl.
CPC ..................... *G06F 1/28* (2013.01)
USPC .......................... 714/22; 714/47.1

(58) Field of Classification Search
CPC ............ G06F 11/3055; G06F 11/3058; G06F 11/3062; G06F 11/0751; G06F 11/0754; G06F 1/3203; G06F 1/3206
USPC ................... 714/47.1, 47.3, 22, 24
See application file for complete search history.

(56) References Cited

U.S. PATENT DOCUMENTS

| | | | |
|---|---|---|---|
| 6,243,831 B1 * | 6/2001 | Mustafa et al. | 714/24 |
| 6,597,620 B1 * | 7/2003 | McMinn | 365/189.09 |
| 7,409,568 B2 * | 8/2008 | Tam et al. | 713/322 |
| 8,375,247 B2 * | 2/2013 | Ferren et al. | 714/15 |
| 2005/0075817 A1 | 4/2005 | Kah et al. | |

(Continued)

*Primary Examiner* — Joshua Lohn
(74) *Attorney, Agent, or Firm* — 24IP Law Group; Timothy R DeWitt

(57) ABSTRACT

In a preferred embodiment, the present invention is a system for avoiding voltage emergencies. The system comprises a microprocessor, an actuator for throttling the microprocessor, a voltage emergency detector and a voltage emergency predictor. The voltage emergency detector may comprise, for example, a checkpoint recovery mechanism or a sensor. The voltage emergency predictor of a preferred embodiment comprises means for tracking control flow instructions and microarchitectural events, means for storing voltage emergency signatures that cause voltage emergencies, means for comparing current control flow and microarchitectural events with stored voltage emergency signatures to predict voltage emergencies, and means for actuating said actuator to throttle said microprocessor to avoid predicted voltage emergencies.

10 Claims, 12 Drawing Sheets

(56) References Cited

U.S. PATENT DOCUMENTS

| | | |
|---|---|---|
| 2006/0104096 A1* | 5/2006 | Alfano .......................... 363/40 |
| 2006/0175116 A1 | 8/2006 | Friedman et al. |
| 2006/0206740 A1* | 9/2006 | Hurd ............................ 713/322 |
| 2007/0022316 A1* | 1/2007 | Erstad ............................ 714/5 |
| 2007/0192636 A1* | 8/2007 | Gonzalez et al. ............. 713/300 |
| 2007/0259545 A1 | 11/2007 | Berenger |
| 2008/0010521 A1* | 1/2008 | Goodrum et al. ............... 714/22 |
| 2008/0189567 A1* | 8/2008 | Goodnow et al. ............. 713/340 |
| 2009/0063884 A1* | 3/2009 | Weekly ........................ 713/340 |
| 2009/0300329 A1* | 12/2009 | Naffziger et al. ............. 712/205 |
| 2010/0169710 A1* | 7/2010 | Royer et al. .................... 714/22 |

* cited by examiner

ADAPTIVE EVENT-GUIDED SYSTEM AND METHOD FOR AVOIDING VOLTAGE EMERGENCIES

CROSS-REFERENCE TO RELATED APPLICATIONS

The present application claims the benefit of the filing date of U.S. Provisional Patent Application Ser. No. 61/151,936 filed by the present inventors on Feb. 12, 2009.

The aforementioned provisional patent application is hereby incorporated by reference in its entirety.

STATEMENT REGARDING FEDERALLY SPONSORED RESEARCH OR DEVELOPMENT

This invention was made with government support under CCF-0429782 and CSR-0720566 awarded by the National Science Foundation. The government has certain rights in the invention.

BACKGROUND OF THE INVENTION

1. Field of the Invention

The present invention relates to systems and methods for predicting current swings that can cause the voltage in a microprocessor to fluctuate beyond safe levels and for avoiding such swings.

2. Brief Description of the Related Art

Power-constrained CMOS designs are making it increasingly difficult for microprocessor designers to cope with power supply noise. As current draw increases and operating voltage decreases, inductive noise threatens the robustness and limits the clock frequency of high-performance processors. Large current swings over small time scales cause large voltage swings in the power-delivery subsystem due to parasitic inductance. A significant drop in supply voltage can cause timing margin violations by slowing logic circuits. For reliable and correct operation of the processor, voltage emergencies, i.e., large voltage swings that violate noise margins, must be avoided.

The traditional way to deal with inductive noise is to overdesign the processor to allow for worst-case fluctuations. Unfortunately, the gap between nominal and worst case operating conditions in modern microprocessor designs is growing. A recent paper on supply-noise analysis for a POWER6 processor shows the need for timing margins that accommodate voltage fluctuations of more than 18% of nominal voltage (200 mV dips at a nominal voltage of 1.1V). N. James, P. Restle, J. Friedrich, B. Huott, and B. McCredie, "Comparison of Split-Versus Connected-Core Supplies in the POWER6 Microprocessor," ISSCC 2007 (2007). Such conservative operating voltage margins ensure robust operation of the system, but can severely degrade performance due to the lower operating frequencies.

The power ceiling in modern microprocessors presents a major challenge to continued performance scaling. Power reduction techniques such as clock gating, when aggressively applied to constrain power consumption, can lead to large current swings in the microprocessor. When coupled with the non-zero impedance characteristics of power delivery subsystem, these current swings can cause the voltage to fluctuate beyond safe operating margins. Such events, called "voltage emergencies," have traditionally been dealt with by allocating sufficiently large timing margins. Unfortunately, on-chip voltage fluctuations and the margins they require are getting worse. Given the direct impact of voltage on circuit delay, intermittent voltage droops, past a lower operating margin, can slow down logic delay paths and lead to timing violations. Voltage spikes that exceed an upper margin can cause long-term reliability issues. Hence, modern designs impose conservative operating voltage margins to avoid these voltage emergencies and guarantee correct operation in the microprocessor. However, large margins translate to inefficient energy consumption and lower performance.

A number of throttling mechanisms have been proposed to dampen sudden current swings, including frequency throttling, pipeline freezing, pipeline firing, issue ramping, and changing the number of the available memory ports. However, such mechanisms require a tight feedback loop that detects an imminent violation and then activates a throttling mechanism to avoid the violation. The detectors are either current sensors or voltage sensors that trigger when a soft threshold is crossed, indicating a violation is likely to occur. Unfortunately, the delay inherent in such feedback loops limits effectiveness and necessitates margins sufficiently large to allow time for the loop to respond.

A typical sensor-based proposal uses a tight feedback loop like that shown in FIG. 1(a). The loop includes a sensor that tries to detect impending emergencies and a throttling actuator that tries to avoid them. The sensor relies on a soft current or voltage threshold as a "canary". Crossing that threshold means that voltage is approaching its lower margin, so the actuator turns on throttling until the crisis is past. Proposed throttling schemes range from frequency throttling, to pipeline freezing/firing, to issue ramping, and altering the number of accessible memory ports. The behavior of the feedback loop is determined by two parameters, the setting of the soft threshold level and the delays around the feedback loop. Unfortunately, choosing those parameters to accommodate reduced operating margins is thwarted by correctness failures and/or performance penalties.

FIG. 1(b) illustrates the use of a soft threshold to throttle execution and prevent an emergency. The graph shows voltage waveforms with and without sensor-based throttling (Throttled Execution and Uncorrected Execution, respectively). The solid horizontal line marked Aggressive Soft Threshold indicates the threshold at which a voltage sensor starts to take action to prevent an emergency. Setting the soft threshold aggressively (i.e., close to the lower operating margin) requires a very fast reaction by the sensor and actuation system. Failure to respond quickly enough results in a voltage emergency. In FIG. 1(b), the voltage starts to recover under throttling, but not in time to avoid crossing the lower operating margin.

FIG. 2(a) shows the sensitivity of sensor-based mechanisms to feedback loop delays by plotting the number of emergencies that go unsuppressed in our benchmark suite as a function of sensor-loop delay times. The graph assumes the soft threshold to be 3% below the nominal voltage and the lower operating margin to be 4% below nominal. Feedback loop delays ranging between 0 and 5 cycles would require a nearly perfect sensor. Yet even a 2-cycle delay causes 50% of all soft threshold crossings to violate the simulated microprocessor's minimum operating margin specification. In other words, fail-safe execution is not possible at this margin using sensor-based schemes, as they cannot operate in a timely manner.

To accommodate slow sensor response times and ensure that throttling effectively prevents emergencies, sensor-based schemes can use conservative soft thresholds. Lifting the soft threshold away from the lower operating margin, as illustrated by the Conservative Soft Threshold in FIG. 1(c), gives the throttling system more time to prevent an emergency. But as the Uncorrected Execution waveform in FIG. 1(c) shows, even in the absence of throttling, a soft threshold crossing may not be followed by an emergency. Throttling execution in such cases decreases performance without any compensating benefit. The more conservative the soft threshold setting, the greater the performance penalty. FIG. 2(b) shows that this penalty can be quite large. Assuming an ideal sensor with no feedback loop delay (i.e., 0-cycle sensor delay), the percentage of benign soft threshold crossings is between 77% and 58% for soft thresholds ranging from 2% to 3%. So even if it were possible to design a feedback loop with no delay, the large performance penalties would deter architects from reducing operating margins.

A sensor-based scheme proposed by Powell and Vijaykumar reduces sensitivity to feedback loop delay by focusing on voltage emergencies that are the result of resonating patterns. See M. Powell and T. N. Vijaykumar, "Exploiting Resonant Behavior to Reduce Inductive Noise," *ISCA*, 2004. While resonance-induced emergencies are dominant for some packages, recent work by Gupta et al. illustrates that non-resonant (pulse) events are also a major source of emergencies across a range of packages. Gupta, K. Rangan, M. D. Smith, G.-Y. Wei, and D. M. Brooks, "DeCoR: A Delayed Commit and Rollback Mechanism for Handling Inductive Noise in Processors," *HPCA* '08 (2008). James et al. have observed isolated (non-resonant) pulses in a POWER6 chip implementation. N. James, P. Restle, J. Friedrich, B. Huott, and B. McCredie, "Comparison of Split-Versus Connected-Core Supplies in the POWER6 Microprocessor," *ISSCC* 2007 (2007). And Kim et al. show that resonant emergencies are likely to become less important than isolated pulses in future chip multi-processors with on-chip voltage regulators, as package inductance effects are decoupled from the power grid via on-chip regulators. W. Kim, M. S. Gupta, G.-Y. Wei, and D. Brooks, "System level analysis of fast, per-core dvfs using on-chip switching regulators," *HPCA* (2007). Therefore, to realize the benefits in improved energy efficiency or performance that reduced margins can enable, new solutions are needed that cope with both resonant and non-resonant voltage emergencies in future systems.

Another way to handle inductive noise is to design the processor for typical-case operating conditions and add a fail-safe mechanism that guarantees correctness despite noise margin violations. This strategy can improve performance, but only if the cost of using the fail-safe mechanism is not too high. However, the coarse-grained checkpointing intervals of traditional checkpoint-recovery schemes (between 100 and 1000 cycles) translate to unacceptable performance penalties. Gupta et al. have proposed a low-overhead implicit checkpointing scheme to handle voltage emergencies by buffering commits until it is confirmed that no voltage emergencies have occurred while the buffered sequence was in flight. M. S. Gupta, K. Rangan, M. D. Smith, G.-Y. Wei, and D. M. Brooks, "DeCoR: A Delayed Commit and Rollback Mechanism for Handling Inductive Noise in Processors," *HPCA* '08 (2008). While shown to be effective, implicit checkpointing is specialized and requires modifications to traditional microarchitectural structures.

SUMMARY OF THE INVENTION

To reduce the gap between nominal and worst-case operating voltages, this paper proposes a "voltage emergency predictor" that identifies when emergencies are imminent and prevents their occurrence.

A voltage emergency predictor anticipates voltage emergencies using "voltage emergency signatures" and throttles machine execution to prevent them. An emergency signature is an interleaved sequence of control-flow events and microarchitectural events leading up to an emergency. A voltage emergency signature is captured when an emergency first occurs by taking a snapshot of relevant event history and storing it in the predictor. A built-in checkpoint-recovery mechanism then rolls the machine back to a known correct state and resumes execution. Subsequent occurrences of the same emergency signature cause the predictor to throttle execution and prevent the impending emergency. By doing so, the predictor enables aggressive timing margins in order to maximize performance.

The signature-based predictor outperforms previously proposed architecture-centric techniques that rely on voltage sensors to detect and react to emergencies via throttling. E. Grochowski, D. Ayers, and V. Tiwari, "Microarchitectural Simulation and Control of di/dt-induced Power Supply Voltage Variation," *Int'l Symposium on High-Performance Computer Architecture* (2002); R. Joseph, D. Brooks, and M. Martonosi, "Control Techniques to Eliminate Voltage Emergencies in High Performance Processors," *Int'l Symposium on High-Performance Computer Architecture* (2003); M. Powell and T. N. Vijaykumar, "Exploiting Resonant Behavior to Reduce Inductive Noise," ISCA, 2004; M. D. Powell and T. N. Vijaykumar, "Pipeline muffling and a priori current ramping: architectural techniques to reduce high-frequency inductive noise," *Int'l Symposium on Low Power Electronics and Design* (2003). In these prior schemes, emergencies are detected by using a voltage sensor to monitor the supply voltage for specific soft threshold crossings, which indicate voltage margin violations are possible. Whenever the supply voltage falls below this threshold, the machine throttles execution in pursuit of emergency prevention. Unfortunately, these schemes cannot always guarantee correctness without incurring large performance penalties. Aggressively setting the soft threshold close to the operating margin limits time available to throttle and successfully prevent an emergency. Alternatively, setting the threshold too conservatively leads to unnecessary throttling that degrades performance. Not every conservative soft threshold crossing eventually crosses the lower operating voltage margin.

In contrast, the present invention recognizes and tracks patterns of emergency-prone activity to proactively throttle execution well before an emergency can occur. The experimental results show high prediction accuracy is possible, which translates to performance enhancements by reducing otherwise conservative margins.

An additional benefit is that the voltage emergency predictor of the present invention does not require fine tuning based on specifics of the microarchitecture nor the power delivery subsystem, as is the case with reactive sensor-based schemes. The current and voltage activity of a microprocessor are products of machine utilization that are specific to the workload's dynamic demands. Capturing that activity in the form of voltage emergency signatures allows the predictor to dynamically adapt to the emergency-prone behavior patterns resulting from the processor's interactions with the power delivery subsystem without having to be preconfigured to reflect the characteristics of either.

Since coarse-grained checkpoint-recovery is already available in existing production systems to serve multiple purposes, preferred embodiments of the present invention use it as a fail-safe mechanism during predictor training. See H. Ando et al., "A 1.3 GHz Fifth-Generation SPARC64 Microprocessor," *Proceedings of Design Automation Conference* (2003); T. J. Siegel, et al., "IBM's s/390 g5 microprocessor design," *IEEE Micro*, 19, 1999; N. Kirman, M. Kirman, M.

Chaudhuri, and J. Martine, "Checkpointed Early Load Retirement," *HPCA '05: Proceedings of the* 11 *th International Symposium on High-Performance Computer Architecture,* 2005; J. F. Martinez, J. Renau, M. C. Huang, M. Prvulovic, and J. Torrellas. Cherry, "Checkpointed Early Resource Recycling in Out-of-order Microprocessors," *International Symposium on Microarchitecture (MICRO),* 2002; S. Narayanasamy, G. Pokam, and B. Calder, "BugNet: Continuously Recording Program Execution for Deterministic Replay Debugging," *ISCA '05: Proceedings of the* 32nd Annual International Symposium on Computer Architecture, 2005; S. Shyam, K. Constantinides, S. Phadke, V. Bertacco, and T. Austin, "Ultra Low-Cost Defect Protection for Microprocessor Pipelines," *ASPLOS-XII,* 2006; D. J. Sorin, M. M. K. Martin, M. D. Hill, and D. A. Wood, "Fast Checkpoint/Recovery to Support Kilo-instruction Speculation and Hardware Fault Tolerance," Computing science technical report, University of Wisconsin-Madison, 2000; N.J. Wang and S. J. Patel, "ReStore: Symptom-Based Soft Error Detection in Microprocessors," *IEEE Trans. Dependable Secur. Comput.,* 3(3), 2006.

In summary, preferred embodiment of the present invention provide the following advances:

Voltage emergency prediction. Recognizing that activity leading to voltage emergencies is a consequence of program control flow and microarchitectural events, we show that voltage emergencies are predictable with over 90% accuracy by exploiting program behavior and locality.

Signature-based voltage emergency reduction. A voltage emergency predictor relies on traditional checkpoint-recovery to capture voltage emergency signatures and prevents emergencies via throttling. Its performance comes to within 5% of an oracle-based throttling scheme.

Efficient predictor implementation. A Bloom filter-based voltage emergency predictor implementation is shown to achieve 11.1% improvement in performance, approaching the 14.2% possible with an oracle-based throttling scheme.

In a preferred embodiment, the present invention is a system for avoiding voltage emergencies. The system comprises a microprocessor, an actuator for throttling the microprocessor, a voltage emergency detector and a voltage emergency predictor. The voltage emergency detector may comprise, for example, a checkpoint recovery mechanism or a sensor. The voltage emergency predictor of a preferred embodiment comprises means for tracking control flow instructions and microarchitectural events, means for storing voltage emergency signatures that cause voltage emergencies, means for comparing current control flow and microarchitectural events with stored voltage emergency signatures to predict voltage emergencies, and means for actuating said actuator to throttle said microprocessor to avoid predicted voltage emergencies.

In another preferred embodiment, the system for presenting voltage emergencies comprises a microprocessor, an actuator for throttling the microprocessor, a sensor for detecting voltage emergencies, a checkpoint recovery mechanism for recovery and resumption of execution, and a voltage emergency predictor. The voltage emergency predictor comprises means for tracking control flow instructions and microarchitectural events, means for storing voltage emergency signatures that cause voltage emergencies, means for comparing current control flow and microarchitectural events with stored voltage emergency signatures to predict voltage emergencies, and means for actuating said actuator to throttle said microprocessor to avoid predicted voltage emergencies.

In still another preferred embodiment, the present invention is a method for preventing voltage emergencies in a microprocessor. The method comprises the steps of tracking control flow instructions and microarchitectural events in the microprocessor, identifying voltage emergencies that occur in the microprocessor, storing voltage emergency signatures corresponding to identified voltage emergencies, comparing current control flow and microarchitectural events in the microprocessor with stored voltage emergency signatures to predict impending voltage emergencies in the microprocessor, and throttling said microprocessor to avoid said impending voltage emergencies. The step of identifying voltage emergencies may comprise detecting execution errors in the microprocessor with a checkpoint recovery mechanism and further may comprise recovery and resumption of execution with said checkpoint recovery mechanism. In another embodiment, the step of identifying voltage emergencies may comprise detecting a voltage surpassing a threshold. The step of identifying voltage emergencies may further comprise recovery and resumption of execution with a checkpoint recovery mechanism.

Still other aspects, features, and advantages of the present invention are readily apparent from the following detailed description, simply by illustrating a preferable embodiments and implementations. The present invention is also capable of other and different embodiments and its several details can be modified in various obvious respects, all without departing from the spirit and scope of the present invention. Accordingly, the drawings and descriptions are to be regarded as illustrative in nature, and not as restrictive. Additional objects and advantages of the invention will be set forth in part in the description which follows and in part will be obvious from the description, or may be learned by practice of the invention.

BRIEF DESCRIPTION OF THE DRAWINGS

For a more complete understanding of the present invention and the advantages thereof, reference is now made to the following description and the accompanying drawings, in which:

FIG. 1(*b*) is a graph of voltage using a conventional sensor-based throttling system with aggressive soft thresholds that allow too little time to prevent voltage emergencies.

FIG. 1(*c*) is a graph of voltage using a conventional sensor-based throttling system with conservative soft thresholds that trigger unnecessary throttling systems.

FIG. 2(*b*) is a bar graph illustrating the performance penalty associated with sensor-based mechanisms for preventing voltage emergencies.

FIG. 4(*b*) is a graph illustration how the system of FIG. 3(*a*) throttle execution with sufficient lead time to prevent voltage emergencies.

DETAILED DESCRIPTION OF THE PREFERRED EMBODIMENTS

Figure 3:
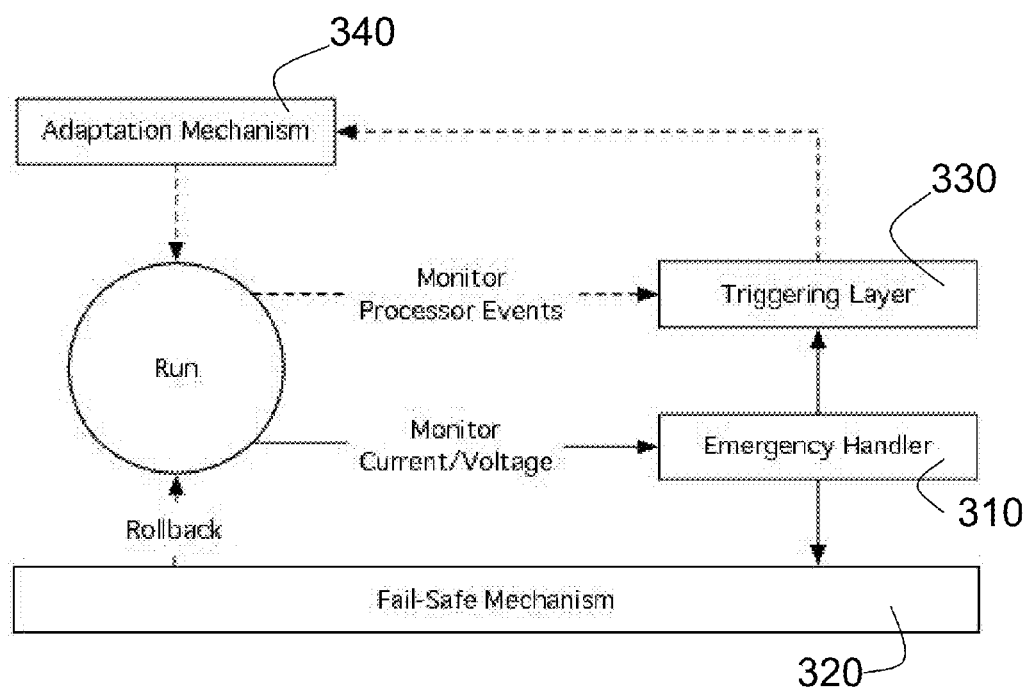
FIG. 3 is a block diagram illustrating an overview of an event-guided architecture for handling voltage emergencies in accordance with a preferred embodiment of the present invention.

FIG. 3 shows the operational flow of our event-guided method for detecting and suppressing voltage emergencies. The parts of the diagram connected by solid arrows detect and respond to actual voltage emergencies. The parts connected by dashed arrows are responsible for learning to recognize impending violations and using this training to suppress future occurrences of violations. Current and voltage are monitored by a sensor, and an emergency handler 310 determines when the supply voltage exceeds operating margins. On detecting a violation, the handler invokes the fail-safe mechanism 320 to recover from any deleterious effects of the emergency. The handler 310 also signals the triggering layer 330 to learn from this emergency, in order to recognize future emergencies. Later, when the triggering layer 330 detects an emergency-prone situation, it invokes the adaptation mechanism 340 to take appropriate preventive action.

When the emergency handler 310 detects a voltage swing that violates the microprocessor's voltage margins, the emergency handler 310 invokes the fail-safe mechanism 320 to recover an uncorrupted execution state. After recovery, the handler 310 invokes the triggering layer 330 to train it to prevent voltage emergencies proactively, collecting details (such as code location and event type) about the emergency just encountered to guide its analysis.

Emergencies can occur either because they are not anticipated by the triggering layer 330 or because event-guided adaptations prove ineffective. The preferred embodiment uses a recovery or fail-safe mechanism 320 similar to the reactive mechanisms for processor error detection and correction that have been proposed for handling soft errors. These mechanisms are based on checkpoint and rollback. Two checkpoint-rollback mechanisms are discussed here, one that makes checkpoints explicitly and one that saves them implicitly. Each is fine-grained—the interval between checkpoints is just tens of cycles. Explicit-checkpoint mechanisms periodically save the architectural state of the processor, i.e., the architectural registers and updated memory state. Restoring the register state incurs substantial overhead, and there are additional cache misses at the time of recovery. (A buffered memory update is assumed, and cache lines updated between checkpoints are marked as volatile.) Moreover, a robust explicit-checkpoint mechanism for noise margin violations requires the maintenance of two checkpoints (since any checkpoint falling after a violation but before its subsequent detection must be considered corrupt).

An implicit-checkpoint-rollback scheme based on delayed commit and rollback that speculatively buffers updates to the machine state for long enough to be sure that no emergency occurred while they were being computed may be used. Completed results wait in the reorder buffer (ROB) or store queue (STQ) for an interval set by the sensor delay of the emergency detector. After that interval, if there have been no emergencies, results are committed to the retirement register file or the L1 data cache.

Explicit checkpointing is a less intrusive addition to existing processor designs, and it is more likely to be useful for purposes other than voltage emergencies. But because of the high frequency of noise margin violations, the performance cost of an explicit checkpoint mechanism could be much greater than that of the implicit mechanism. Our event-guided emergency suppression method brings the overhead of explicit checkpointing into line with that of implicit checkpointing, giving us the best of both approaches.

The triggering layer or mechanism 330 tries to guide the hardware through safe execution using adaptation mechanisms 340 that prevent emergencies. The triggering layer 330 waits for event notifications from the emergency handler 310. When it receives one, it caches the time and recent microarchitectural event history, and it updates a frequency counter for the particular emergency. This information determines when to locate and adapt the source instruction that caused an emergency. Once an emergency has been flagged as frequently occurring, the triggering layer uses an event characterization algorithm to determine the root cause of the emergency. See M. S. Gupta, K. Rangan, M. D. Smith, G.-Y. Wei, and D. M. Brooks, "Towards a software approach to mitigate voltage emergencies," ISLPED, 2007. It targets subsequent occurrences of the emergency for prevention, using microarchitectural events as cues to activate an adaptation mechanism.

In order to provide pertinent information to the triggering layer 330 of the event-guided approach, the processor maintains two circular structures similar to those found in existing architectures like IPF and PowerPC. The first is a branch trace buffer (BTB), which maintains information about the most recent branch instructions, their predictions, and their resolved targets. The second is a data event address register (D-EAR), which tracks recent memory instruction addresses and their corresponding effective addresses for all cache and TLB misses. The triggering layer 330 reads this information at every voltage emergency and uses it to suppress future emergencies.

Each entry is augmented in the BTB and D-EAR structures with a saturating counter that gives the age of the entry in cycles. To determine whether an event described in one of the structures is the likely cause of a subsequent emergency, we need to know the time interval between the two. The age of an entry also helps the hardware to discard entries that are too old to be of use to the triggering mechanism.

The trigger mechanism can either be implemented purely in hardware or as software-assisted hardware. A hardware-only mechanism is practical because monitoring fewer than twenty program points at once typically covers 90% of all emergencies. Information about which instructions to track and the associated emergency-causing events can be maintained in a small content-addressable memory that recognizes when to trigger preventive action. Alternatively, software can be used to add hints to instructions (such as mispredicted branches or loads that have missed in the data cache) that have been associated with noise margin violations, so that the hardware can take preventive measures whenever those instructions are again associated with emergency-prone events. Software has potential benefits that hardware-only mechanisms do not share, since a software layer can perform intelligent code transformations to prevent emergencies.

Adaptations are intended to avoid the sudden current increases that lead to large voltage swings. Four kinds of adaptations are discussed: frequency throttling, using a current shunt regulator, pseudo-instruction padding, and prefetching. These techniques either stretch out current fluctuations in time or smooth them out in amplitude.

Throttling mechanisms spread out increases in current by slowing processor activity. Several kinds of throttling have been proposed. See, for example, E. Grochowski, D. Ayers, and V. Tiwari, "Microarchitectural simulation and control of di/dt-induced power supply voltage variation," HPCA-8 (2002); R. Joseph, D. Brooks, and M. Martonosi, "Control techniques to eliminate voltage emergencies in high performance processors," HPCA-9 (2003); M. D. Powell and T. N. Vijaykumar, "Pipeline muffling and a priori current ramping: architectural techniques to reduce high-frequency inductive noise," ISLPED (2003); M. D. Powell and T. N. Vijaykumar, "Exploiting resonant behavior to reduce inductive noise," ISCA-28 (2004). In a preferred embodiment, simple frequency throttling is used: dividing the frequency of the system in half whenever throttling is turned on. This quickly reduces current draw, but it also reduces performance by slowing down the machine. Throttling is used both for mispredicted branches and for loads flagged as missing in the L2 cache.

A push-pull regulator topology that uses an additional higher-than-nominal supply voltage, comparator-based feedback, and a switched-source follower output stage to reduce supply noise previously has been proposed generally. See E. Alon and M. Horowitz, "Integrated regulation for energy-efficient digital circuits," CICC (2007). In a preferred embodiment of the present invention, the output stage of such a regulator is driven with the triggering mechanism (hardware-event-guided or softwareguided) of the present invention. This may be referred to as it the current-shunt mechanism. This technique has an effect similar to throttling, but without the extra performance penalty associated with throttling. The current shunt is used either for a mispredicted branch or an L2 miss. This mechanism suffers from additional power overhead since the extra charge dumped into the power grid comes from a higher supply voltage. To simplify the comparison of schemes, this power overhead can be translated into performance loss. For example, designers might compensate for this power overhead by reducing global supply voltage and clock frequency. For ease of analysis purposes, it is assumed that a 3% increase in power translates to a 1% decrease in performance.

One possible way to deal with a sudden increase in activity when an L2 cache miss returns is to create a chain of instructions with data dependences that require them to be issued serially, so that processor activity increases gradually. In a preferred embodiment of the present invention, this is done by adding redundant pseudoinstructions, which may be referred to as pseudo-nops. However, these nop instructions degrade performance by wasting CPU cycles. Hence, a selective nop strategy is employed whereby pseudonops are discarded unless the L2 miss occurs. Analysis shows that a single nop is able to achieve the same reduction in emergencies as multiple pseudo-nops with less performance degradation, so a single pseudo-nop insertion is used in the evaluation.

Another way to deal with large stalls is by prefetching loads that cause large L2 cache miss penalties. To study the potential of dynamic prefetching adaptations for dealing with emergencies, an ideal prefetch mechanism is assumed; the system inserts prefetch instructions for delinquent loads, eliminating further cache misses for those loads. This does not capture the complexities of a dynamic prefetching engine, but it gives a measure of its potential to combat emergencies. To be unbiased in the analysis, the performance benefits of prefetching are omitted when considering the overall performance of the system.

An effective emergency avoidance mechanism preferably should meet two criteria: First, it must anticipate an emergency accurately to prevent performance degradation due to unnecessary throttling. Second, it must initiate the emergency avoidance mechanism with enough lead time to throttle and successfully prevent the emergency from occurring. With the present invention it is possible to predict voltage emergencies with high accuracy and sufficient lead time to throttle and prevent emergencies.

Figure 4A:
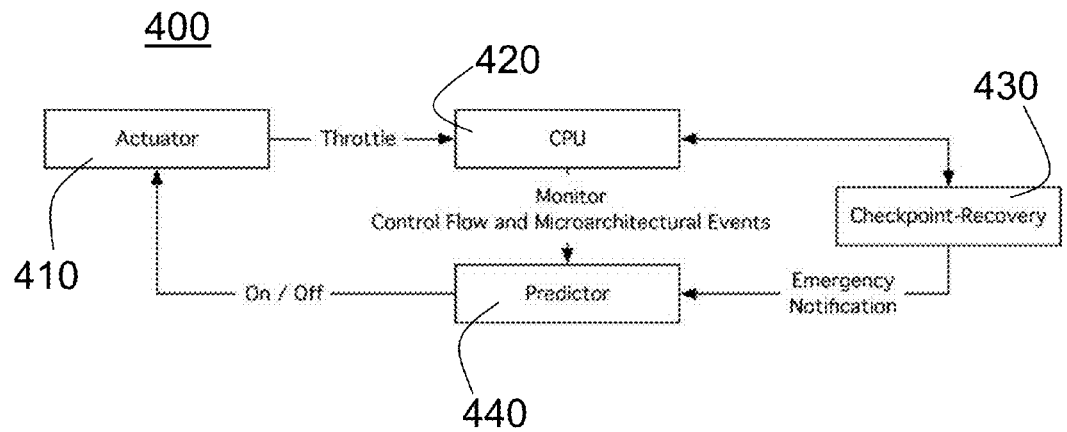
FIG. 4(*a*) is a block diagram of a system for predicting voltage emergencies in accordance with a preferred embodiment of the present invention.

A voltage emergency predictor is a structure that learns recurring voltage emergency activity during runtime and prevents subsequent occurrences of said emergencies via execution throttling. FIG. 4(a) presents a block diagram of a preferred embodiment of the invention. As shown in FIG. 4(a), the system 400 has an actuator 410, a CPU or microprocessor 420, a checkpoint recovery system 430, and a voltage emergency predictor 440. The predictor 440 monitors control flow and microachitectural events and keeps track of the voltage emergency signatures that cause voltage emergencies identified by the checkpoint-recovery block or mechanism 430, for example by storing the voltage emergency signature in memory or other storage media. The predictor 440 also actuates throttling of the microprocessor 420 via actuator 410 to avoid future emergencies, but does not suffer limitations associated with sensor delays or soft thresholds. Unlike sensor-based schemes, the prediction-based approach of the present invention allows the microprocessor to operate with margins much tighter than otherwise possible.

A voltage emergency signature comprises an interleaved sequence of program control flow and microarchitectural events that give rise to an emergency. Voltage emergency signatures are dynamic and, as such, must be discovered at runtime. Initially, no emergency signatures are known. As the program executes, emergencies are detected as margin violations occur. Since an emergency can potentially corrupt machine state, a checkpoint-recovery mechanism is in place to recover and resume execution. While invoking the recovery mechanism, the predictor captures the signature of the emergency. Over time, the predictor collects a history of emergency-prone activity and uses this history to successfully prevent future emergencies via throttling.

Figure 1A:
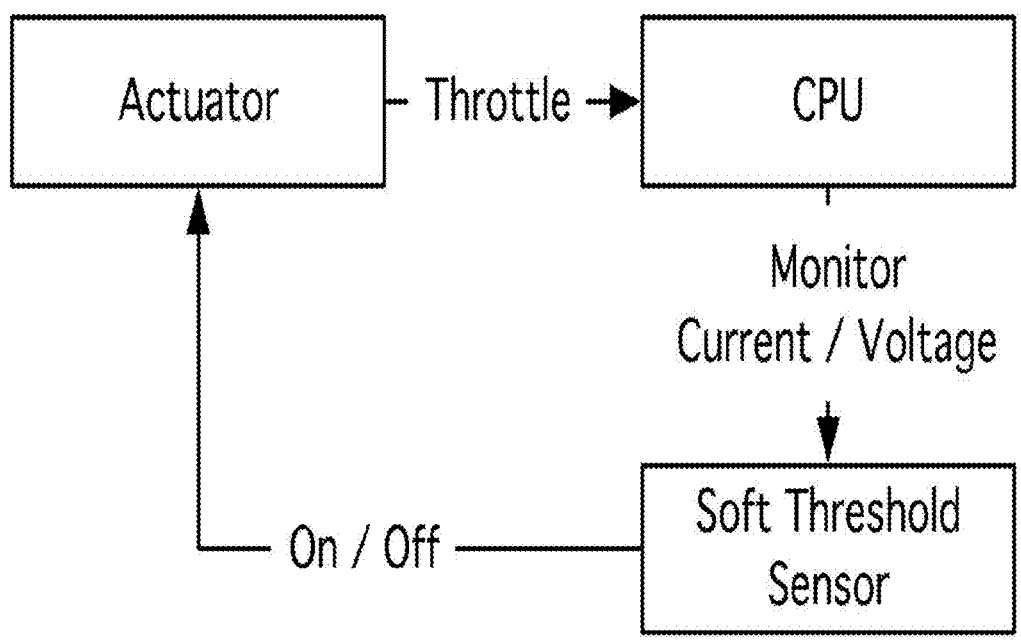
FIG. 1(*a*) is a block diagram of a conventional system for sensor-based throttling.
Figure 1B:
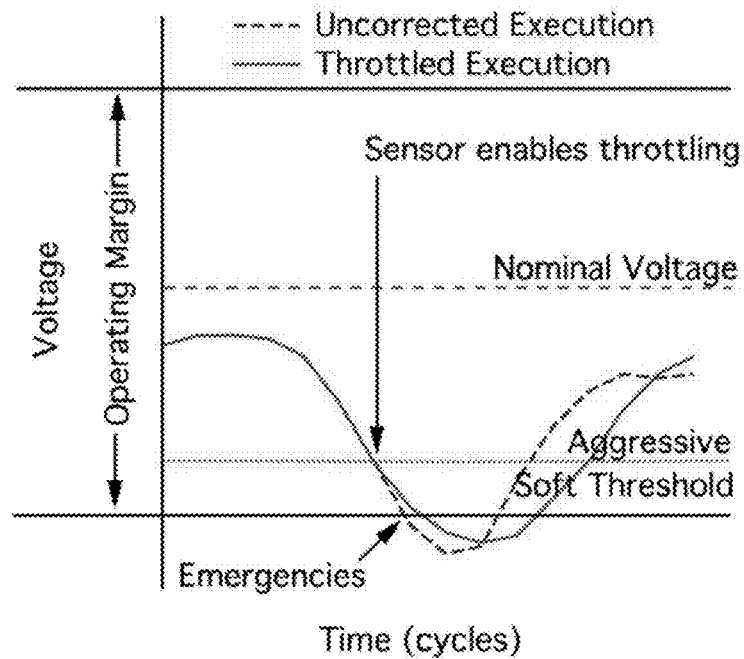
Figure 1C:
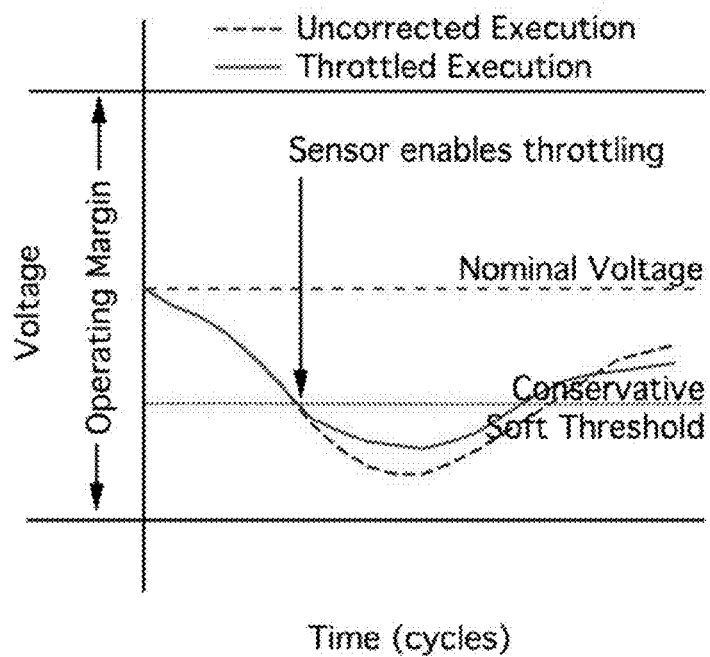
Figure 4B:
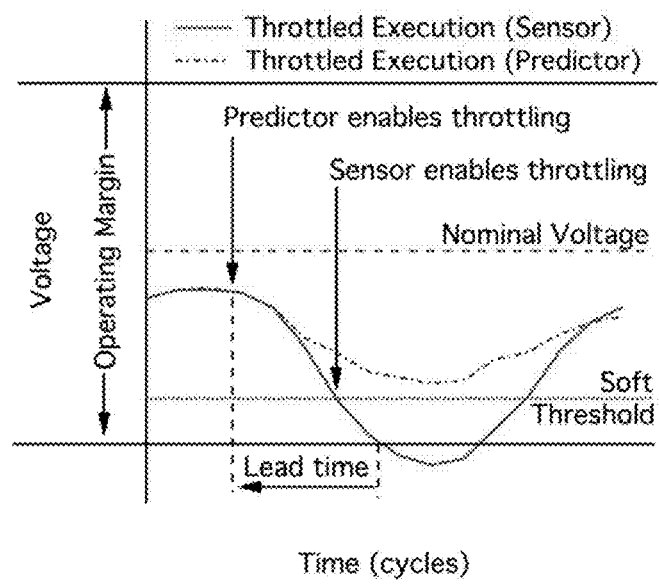

A voltage emergency predictor does not require a soft threshold. Instead, it monitors sequences of program paths and architectural events, and initiates throttling whenever an emergency-causing pattern is detected. For clarity and a brief overview, FIG. 4(b) illustrates how a preferred embodiment of a predictor-based scheme of the present invention outperforms a sensor-based throttling scheme. As soon as the predictor observes a voltage emergency signature, it starts to throttle execution with sufficient lead time to prevent an emergency from occurring. In contrast, sensor-based throttling, corresponding to waveform Throttled Execution (Sensor)

from FIG. 1(b), fails to avoid the emergency with aggressive soft threshold settings. Conservative soft thresholds incur large performance penalties.

The working principles underlying voltage emergency prediction of the present invention is described using a specific, but real-life, scenario from benchmark 403.gcc. Building upon the insights gained from this example, an embodiment illustrating how to capture a voltage emergency signature, which is the enabling mechanism behind a voltage emergency predictor, is described. Factors that influence the quality of an emergency signature, such as the type and amount of information recorded, are then discussed.

Repeating code patterns give rise to repeating patterns of memory access and data flow through the processor. Gupta et al. show repeating sequences of processor activity have the potential to cause voltage emergencies. M. S. Gupta, K. Rangan, M. D. Smith, G.-Y. Wei, and D. M. Brooks, "Towards a Software Approach to Mitigate Voltage Emergencies," ISLPED '07, 2007. They elaborate that microarchitectural events such as cache misses and pipeline flushes stall the pipeline. As a consequence, machine activity temporarily reduces. Upon recovering/restarting, there is a rush of activity that causes the current to spike and the voltage to drop sharply; a voltage emergency occurs when the voltage exceeds the lower operating margin. However, it is not well understood when such microarchitectural events are benign versus harmful. In other words, there is no guarantee that a branch misprediction or any recurring event will always cause an emergency. With the present invention it is possible to predict the likelihood of an emergency more accurately by taking into account the context leading up to the emergency.

Figure 5A:
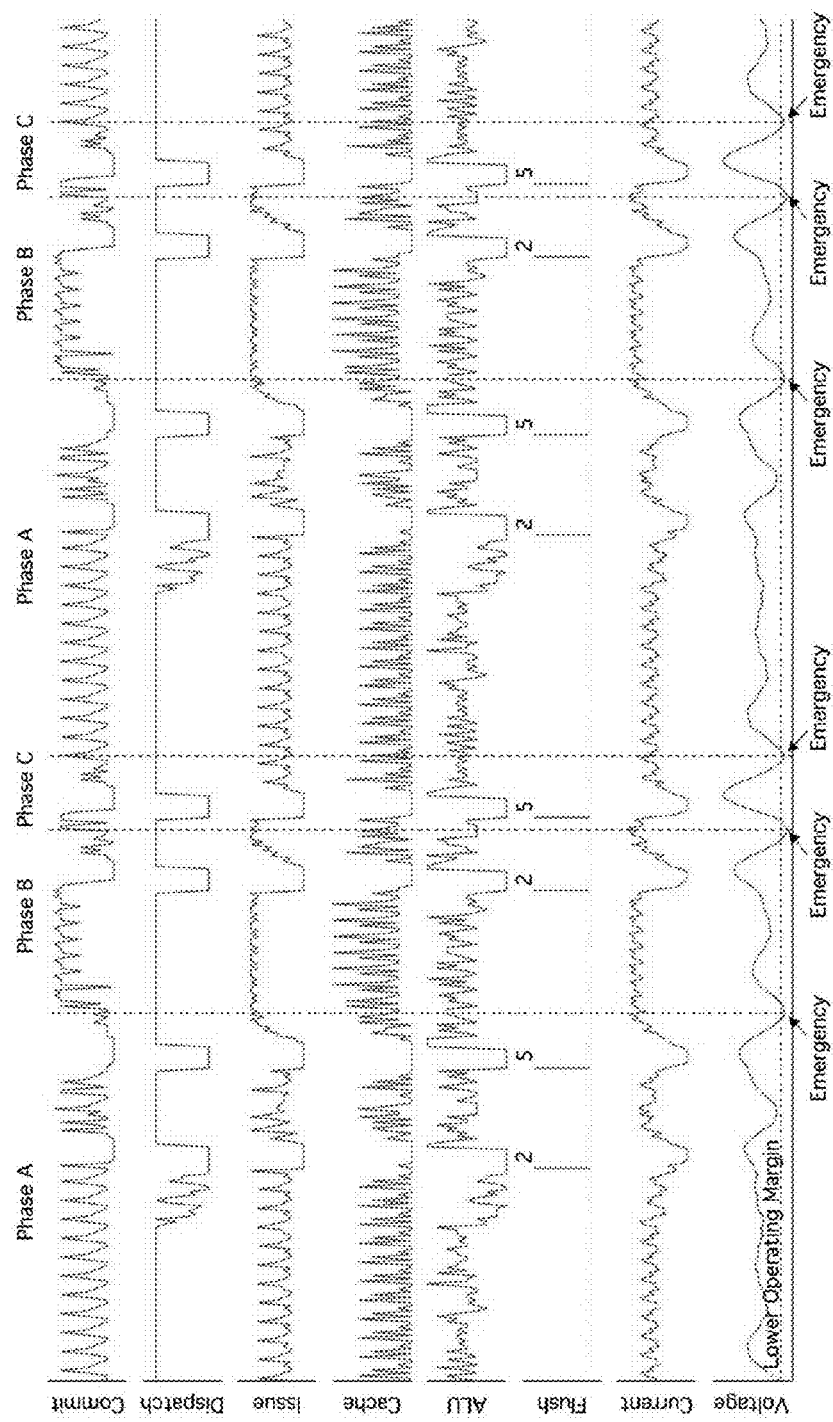
FIG. 5(*a*) is a graph illustrating the association of voltage emergencies with recurring activity over 880 cycles.
FIG. 5(b) is a diagram of an emergency prone nested loop in function init_regs of benchmark 403.gcc init_regs's activity snapshot in FIG. 4(a).
Figure 5B:
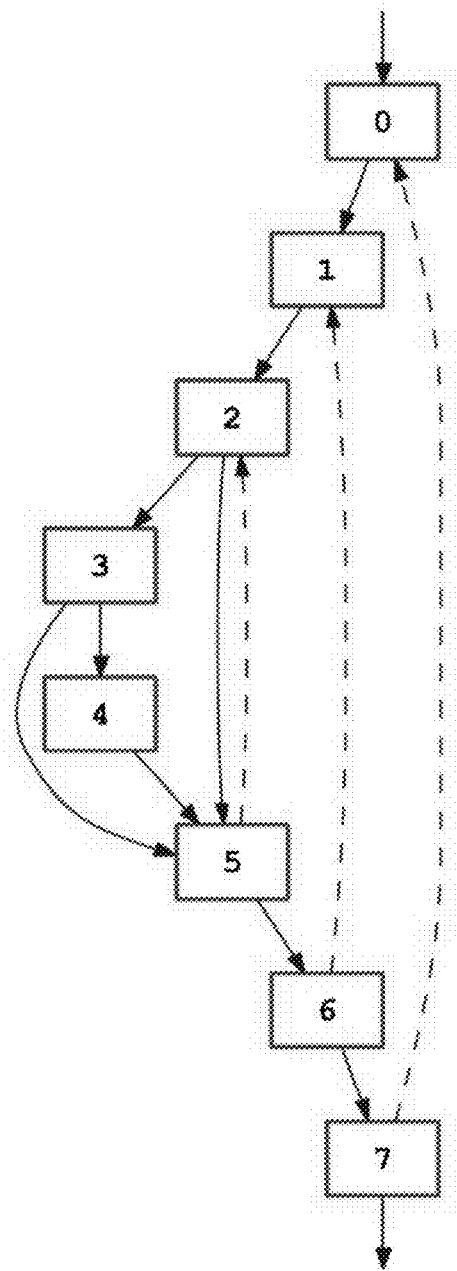

A microarchitectural event acting in complete isolation only sometimes causes an emergency by itself. To help illustrate when an event causes an emergency, FIG. 5(a) shows pipeline activity over 880 cycles for benchmark 403.gcc while it is executing the nested loop illustrated in FIG. 5(b). FIG. 5(a) illustrates pipeline flushing due to branch mispredictions using a vertical bar in the Flush subgraph. The number next to each vertical bar in the Flush graph corresponds to the basic block number in FIG. 5(b) containing the mispredicted branch. Other relevant pipeline activities across different parts of our simulated microprocessor ranging from cache access, to functional unit usage, to the rate at which instructions are being dispatched, issued and committed are also shown for the same time frame. The resulting current draw and voltage activity are also shown. Lastly, FIG. 5(a) shows three distinct phases A, B and C (see top of figure) and each phase terminates at an emergency (see bottom of figure).

Microarchitectural events perturb machine activity significantly, but by themselves are not responsible for voltage emergencies. Pipeline flush Event 2 in FIG. 5(a) is an ideal candidate for illustrating this point. Event 2 in Phase A causes a voltage droop a few cycles before Event 5 (also in Phase A), but it does not cause an emergency. The same event, however, always causes an emergency in Phase B (at the end of B). Understanding the processor activity leading up to these events explains this inconsistent behavior. The Issue, as well as other rates prior to Event 2 are different between Phase A and Phase B, so the perturbation effects of Event 2 are different between the phases. By comparison, pipeline flush Event 5 always occurs just prior to an emergency in both Phase A and Phase C. Nevertheless, our argument that activity prior to an event matters holds true. The voltage just prior to Event 5 in Phase A is rising versus falling in Phase C. The latter occurs because the voltage is already in flux due to the perturbation brought about by Event 2 in Phase B. For this reason, any scheme attempting to characterize and exploit recurring patterns must take into account the execution context preceding an emergency.

Voltage emergencies are uniquely identifiable by tracking control flow instructions and microarchitectural events in order of occurrence. Rapid fluctuations in a program's control and data flow and in its level of parallel utilization of processor resources lead to changes in current flow that induce large voltage swings. For instance, the distinct current and voltage activity between phases A, B and C are the result of different control flow paths exercised by the program combined with the voltage droops induced by pipeline flush Events 2 and 5. During the early part of Phase A, the program is executing basic blocks 2→3→5 (from FIG. 5(b)) in a steady-state manner. The stable and repetitive Issue rate pattern during the early part of Phase A in FIG. 5(a) confirms this. Slightly past the midpoint of Phase A, the program switches control flow from basic blocks 2→3→5 to basic blocks 2→5. This switch triggers a pipeline flush to recover from speculatively executing incorrect code along Edge 2→3 to executing correct code along Edge 2→5. The activity on the recovery path following the pipeline flush causes the voltage to droop slightly but not enough to violate the operating margin (shown using Lower Operating Margin). After a few cycles, a misprediction on basic block 5's control instruction eventually leads to a voltage emergency. So the emergency in Phase A is because of the activity including, as well as following, basic blocks 2→3→5 combined with pipeline flush Events 2 and 5. In contrast, the emergency in Phase B arises from executing basic blocks 2→3→4→5 followed by the single flush Event 2. Consequently, tracking control flow sequence along with pipeline flush events in order of occurrence yields two unique activity patterns representing Phase A and Phase B.

Voltage emergencies, like program phases, are repetitive over a program's lifetime, which make them predictable. Consider the three phases illustrated in FIG. 5(a). The phases are recurring because execution sequence flows through phases A→B→C and back to Phase A. A subsequent occurrence of the same phase leads to yet another emergency. For instance, Event 2 always causes an emergency as execution flows through phases B→C, but not through phases A→B. Thus, a pattern of voltage emergency occurrence emerges. Identifying and exploiting such recurring activity is the basis for predicting voltage emergencies in terms of program behavior, as well as microarchitectural behavior.

A preferred embodiment of the hardware used to capture program control flow and microarchitectural event interleaving is now described. Capturing a voltage emergency signature in a preferred embodiment of the present invention requires an emergency to occur at least once. Thus the preferred embodiment has a mechanism, in this embodiment a voltage sensor, to monitor operating margin violations. The embodiment is not time-sensitive to sensor delay because the predictor does not react to sensing a soft threshold crossing to throttle. The sensor is used to signal that an emergency has occurred and the system ought to take appropriate actions.

Processor state is potentially corrupted as emergencies occur, since voltage emergencies induce timing faults, so the preferred embodiment has a fail-safe checkpoint-recovery mechanism to recover from emergencies. The failsafe mechanism initiates a recovery whenever the sensor detects an emergency, and in that process also captures a voltage emergency signature. Checkpoints can be taken at varying intervals (e.g., 10-1000 cycles). A 100-cycle rollback penalty is assumed in this embodiment.

Coarse-grained checkpoint-recovery is already shipping in today's production systems, and researchers are proposing a broad range of novel applications that use traditional checkpoint-recovery. With ever-increasing applications of this failsafe mechanism, the checkpoint-recovery may become part of future mainstream processors. However, checkpoint-recovery alone as a solution for handling voltage emergencies is unacceptable due to performance penalties as previously discussed and as will be shown below.

The predictor of a preferred embodiment relies on a shift register to capture the interleaved sequence of control flow instructions and architectural events that give rise to an emergency. A signature is a snapshot of the event history register. The interleaving of events in the event history register is important for capturing the dynamic current and voltage activity resulting from program interactions with the underlying microarchitecture. The purpose of tracking the instruction stream is to capture the dynamic path of a program. Consequently, control flow instructions are ideal candidates for tracking a program's dynamic execution path.

Event history tracking is a well-studied topic in the area of branch prediction. The present invention, however, is unique in that it can identify the information flow that precisely captures activity prone to voltage emergencies.

Figure 6:
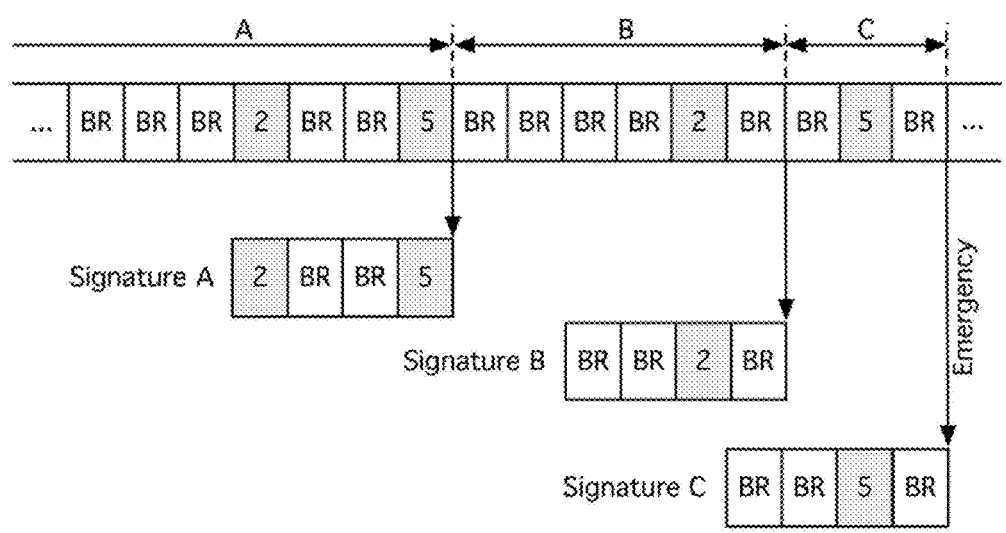
FIG. 6 is a diagram illustrating an overview of voltage emergency signatures.

FIG. 6 illustrates example snapshots of the emergencies shown in FIG. 5(a) across phases A, B and C. The updates into a 4-entry wide event history register are shown over time. At the point of the emergency in Phase B, the history register contains the following (from oldest to most recent): two control flow instruction addresses (illustrated as BR) and an event encoding for the pipeline flush (illustrated as 2), followed by another branch. It is important to never clear the event history register after capturing a snapshot to maintain a rolling window of contextual information. For example, the oldest BR in Signature C overlaps with the most recent entry in Signature B.

Since voltage emergencies contribute to timing faults, all predictor logic and checkpoint-recovery hardware must be carefully designed with sufficiently conservative timing margins. As these structures are not timing critical, there are no performance implications. Any state corruption in the predictor logic only leads to incorrect predictions, and will therefore only affect the performance of the system due to unnecessary throttling, but it will not violate correctness guarantees.

The function of a voltage emergency signature in accordance with a preferred embodiment of the present invention is to precisely indicate whether a pattern of control flow and microarchitectural event activity will give rise to an emergency. To evaluate the effectiveness of different flavors of signatures, predictor accuracy is defined as the fraction of predicted emergencies that become actual emergencies.

Information tracking in the event history register must correspond to parts of the execution engine that experience large current draws, as well as dramatic spikes in current activity. The event history register can collect the control flow trace at different points in a superscalar processor: in-order fetch and decode, out-of-order issue, and in-order commit. Each of these points contributes different amounts of information pertaining to an emergency. For instance, tracking execution in program order fails to capture any information regarding the impact of speculation on voltage emergencies. Tracking information at the in-order fetch and decode sequence captures the speculative path, but it does not capture the out-of-order superscalar issuing of instructions.

Figure 7A:
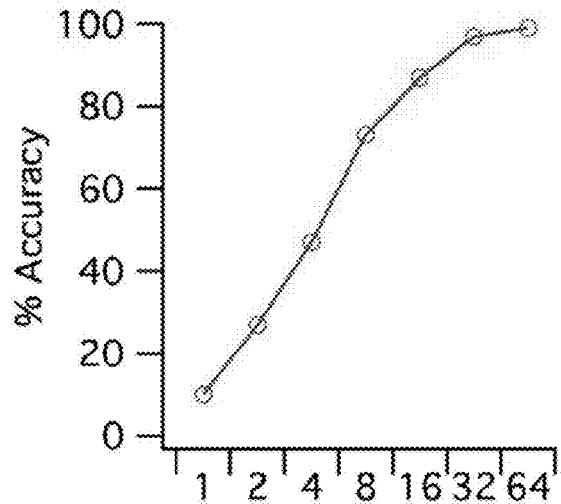
FIGS. 7(a) and (b) are graphs illustrating that voltage emergency prediction accuracy improves as (a) signature contents represent machine activity more closely and as (b) the number of entries per signature increases.

The accuracies of different signature types are illustrated in FIG. 7(a) (assuming a signature size of 32 entries, which will be discussed next). Tracking committed control flow sequences in the event history register gives an accuracy of only 40%. If the history register tracks information at the decode stage, an accuracy of 72% is possible because the decode stage captures the speculative control flow path. Accuracy improves further by 12%, from 72% to 84%, if the history register tracks control flow at the issue stage, since we can now capture interactions more precisely at the level of hardware instruction scheduling and code executed along a speculative path.

Interleaving microarchitectural events with program control improves accuracy even further, as processor events provide additional information about swings in the supply voltage. For instance, pipeline flushes cause a sharp change in current draw as the machine comes to a near halt before recovering on the correct execution path (as observed in FIG. 5(a) immediately following pipeline flush events). The last two bars of FIG. 7(a) show accuracy improvements from adding microarchitectural event activity to the event history register. The second to last bar represents the effect of capturing events that have the potential to induce large voltage swings—pipeline flushes and secondary (L2) cache misses. An improvement of five percentage points is achieved by taking flushes and L2 misses into account (i.e., total accuracy of 89%). Another additional improvement in the margin of ~4% Capturing the more frequently occurring events like DTLB and DL1 misses contributes additional improvements of ~4%. Microarchitecture perturbations resulting from instruction cache activity (i.e., IL1 and ITLB) are negligible and do not lead to an improvement in accuracy.

From here on, we assume the event history register resides at the issue stage of the pipeline and captures microarchitectural-event activity. More formally, the event history register is updated whenever a control flow instruction is executed, along with Level 1 and Level 2 cache and TLB misses. Lastly, pipeline flushes are also events recorded in the event history register.

Size. Accuracy depends not only on recording the right interleaving of events, but also on balancing the amount of information the event history register keeps. Accuracy improves as the length of history register increases.

However, it can be detrimental to increase the number of register entries beyond a certain count. Large numbers of entries in a signature can cause unnecessary differentiation between similar signatures—signatures whose most recent entries are identical and whose older entries are different, but not significantly so. The predictor would have to track more unique signatures per emergency because of this differentiation.

Figure 7B:
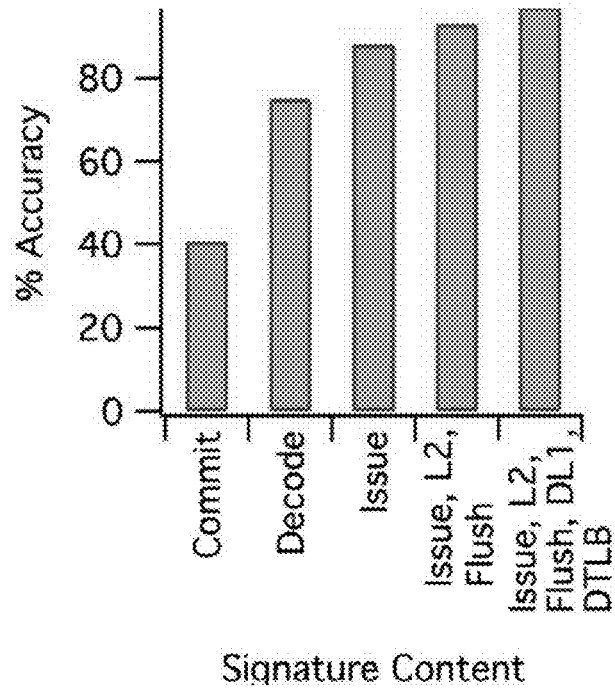

FIG. 7(b) shows prediction accuracy improves as signature size increases. Accuracy is only 13% on average for a signature containing only 1 entry, which supports the proposition that voltage emergencies do not solely depend upon the last executed branch or a single microarchitectural event. It is the history of activity that determines the likelihood of a recurring emergency. Prediction accuracy begins to saturate once signature size reaches 16, and peaks at 99% for a signature size of 64 entries.

Signature encoding. Hardware implementations are resource constrained. So the number of bits representing a signature in a realistic hardware implementation matters. To avoid large overheads, we use a 3-bit encoding per entry in the event history register. But encoding causes aliasing between signatures. Therefore, we extend an encoded signature to also contain the program counter for the most recently taken branch—the anchor PC. Anchor PC's have the added benefit of implicitly providing the complete path information leading up to the most recent event in the history register. The 3-bit encoding compactly captures all of the relevant information consisting of different processor events, and takes into account the edge taken by each branch (i.e., fall-through paths are encoded as 000 versus 001 for taken edges). The compact representation described above results in a total signature length of 16 bytes (4 bytes for the anchor PC and 12 bytes for a signature size of 32 entries with 3 bits per entry).

Signature compaction. We can further reduce hardware overheads by folding multiple signatures corresponding to a specific anchor PC into a single representative signature. We use a weighted similarity metric based on Manhattan distance to determine how much compaction is possible for a set of signatures corresponding to a particular benchmark. Let x and y be k-element signatures associated with the same instruction address. We define the similarity of x and y to be $$s = \frac{2}{k(k+1)} \sum_{i=1}^{k} \frac{i}{0} \begin{cases} \text{if } x_i = y_i \\ \text{otherwise} \end{cases}$$

If the signatures are identical, s is one. If no two corresponding elements are the same, it is zero. The later elements in x and y correspond to later events in time. They are more heavily weighted in s, because they are more significant for emergency prediction. Other measures of similarity might yield better compaction, but they would be more expensive to compute in hardware. For a given instruction address, the signatures are partitioned into maximal sets in which each signature x is related to one or more other signatures y with similarity of 0.9 or greater. The resulting partition is then used instead of the original signature set.

The number of recurring signatures per benchmark varies significantly. Benchmark 403.gcc has nearly 87000 signatures that repeatedly give rise to emergencies. At the other end of the spectrum is benchmark 462.libquantum with only 39 signatures. Applying signature compaction on 403.gcc reduces the number of signatures to 29000, thereby achieving a ~67% reduction. Overall, compaction reduces the number of signatures by over 61% and the biggest winners are benchmarks that exhibit a large number of signatures.

EXAMPLES

The vehicle for the examples presented below is the x86 SimpleScalar infrastructure. Table 1 lists the configuration parameters used to initialize SimpleScalar for our baseline microprocessor design, which we refer to as Arch 1.

TABLE 1

Baseline architecture (Arch 1) parameters for SimpleScalar.

| | |
|---|---|
| Clock Rate | 3.0 GHz |
| Inst. Window | 128-ROB, 64-LSQ |
| Functional Units | 8 Int ALU, 4 FP ALU, 2 Int Mul/Div, 2 FP Mul/Div |
| Fetch Width | 8 Instructions |
| L1 D-Cache | 64 KB 2-way |
| L2 I/D-Cache | 2 MB 4-way, 16 cycle latency |
| RAS | 64 Entries |
| Branch Penalty | 10 cycles |
| Branch Predictor BTB | 64-KB bimodal gshare/chooser 1K Entries |
| Decode Width | 8 Instructions |
| L1 I-Cache | 64 KB 2-way |
| Main Memory | 300 cycle latency |

The workload set is comprised of benchmarks from the SPEC CPU2006 suite. All but a few were simulated for 100 million instructions across their different inputs using the phase most heavily weighted by Simpoint (1445.gobmk input 13x13, 456.hmmer, 471.omnetpp, 473.astar, 434.zeusmp, 453.povray and 470.lbm are omitted because SimpleScalar's x86 decoder does not support instruction encodings used by these benchmarks). E. Perelman, G. Hamerly, M. V. Biesbrouck, T. Sherwood, and B. Calder. Using simpoint for accurate and efficient simulation. In *SIGMETRICS '03*, New York, N.Y., USA, 2003. ACM. 1 The benchmarks were compiled at optimization level—O3 using the GNU GCC 3.4 compiler toolchain.

To get a detailed cycle-accurate current profile, a modified version of Wattch is incorporated into the SimpleScalar simulator. See, D. Brooks, V. Tiwari, and M. Martonosi. Wattch: a Framework for Architectural-level Power Analysis and Optimizations. In *27th Annual International Symposium on Computer Architecture*, 2000. Simulated current profiles are convolved with an impulse response of the power delivery subsystem to obtain voltage variations. Other studies use this second-order model as well.

Operating margin. For the purpose of quantitative comparisons and evaluation, a maximum swing of 4% is allowed between nominal supply voltage and the lower operating voltage margin, beyond which a voltage emergency occurs. However, the example is independent of a specific margin and the major findings remain unchanged across different margin settings.

Power delivery model. Three different packages are evaluated. Quality factor (Q) is the ratio of the resonant frequency to the rate at which the package dissipates its energy. A larger Q gives rise to larger voltage swings for currents oscillating within the resonance band of frequencies. Applications with current fluctuations in the resonance band therefore suffer more from inductive noise with a high-Q package. The packages are labeled Pkg 1, Pkg 2 and Pkg 3. Details pertaining to the packages are shown in Table 2.

TABLE 2

Characteristics of the packages evaluated.

| Package | Peak Impedance (mOhm) | Current (A) | Quality Factor | Resonance Cycles | Comment |
|---|---|---|---|---|---|
| Pkg 1 | 5 | 16-50 | 3 | 30 | Pentium 4 [2] |
| Pkg 2 | 2 | 30-70 | 2 | 60 | Used in [13] |
| Pkg 3 | 17 | 16-50 | 6 | 30 | Worst package |

Our baseline package is Pkg 1, which closely resembles characteristics of the Pentium 4 package. Intel. Intel Pentium 4 Processor in the 423 Pin/Package/Intel 850 Chipset Platform, 2002. Package Pkg 2 is representative of the package used in an earlier study, and its parameters are based on the Alpha 21264/21364 package. For comparisons, Package Pkg 3 is included, which represents a bad package with very large quality factor.

Single-core vs. Multi-core and Multi-threaded Architectures.

The examples are limited to a singlecore platform with an off-chip power delivery subsystem. Much of prior work is also within the context of single-core platforms, which allows comparative analysis of the present scheme to others. Kim et al. and Gupta et al. have shown that voltage emergencies are problematic for multi-core platforms as well. M. S. Gupta, J. L. Oatley, R. Joseph, G.-Y. Wei, and D. M. Brooks, "Understanding voltage variations in chip multiprocessors using a distributed power-delivery network," *DATE*, 2007. The authors demonstrate that synchronous/inphase operation of cores or chip-wide resonant behavior can cause voltage emergencies, and so can per-core power domains. It is possible to extend the present invention to capture inter-core activity leading to emergencies by tracking additional events such as cache coherence messages and inter-thread synchronization primitives. And in the case of a multi-threaded architecture, it is possible to easily adapt the emergency capturing mechanism to be a part of the hardware's thread context.

Predictor Accuracy Evaluation

A signature-based emergency predictor, in contrast to a sensor-based scheme, is broadly applicable across different combinations of microprocessor designs and power delivery subsystems with no need for fine-tuning, catering for the worst-case, or relying on soft thresholds. In this section, the robustness of signature-based prediction across different machine configurations assuming a signature size of 32 entries is demonstrated. An ability to predict emergencies 16 cycles ahead of time with 90% accuracy is also demonstrated.

Figure 8A:
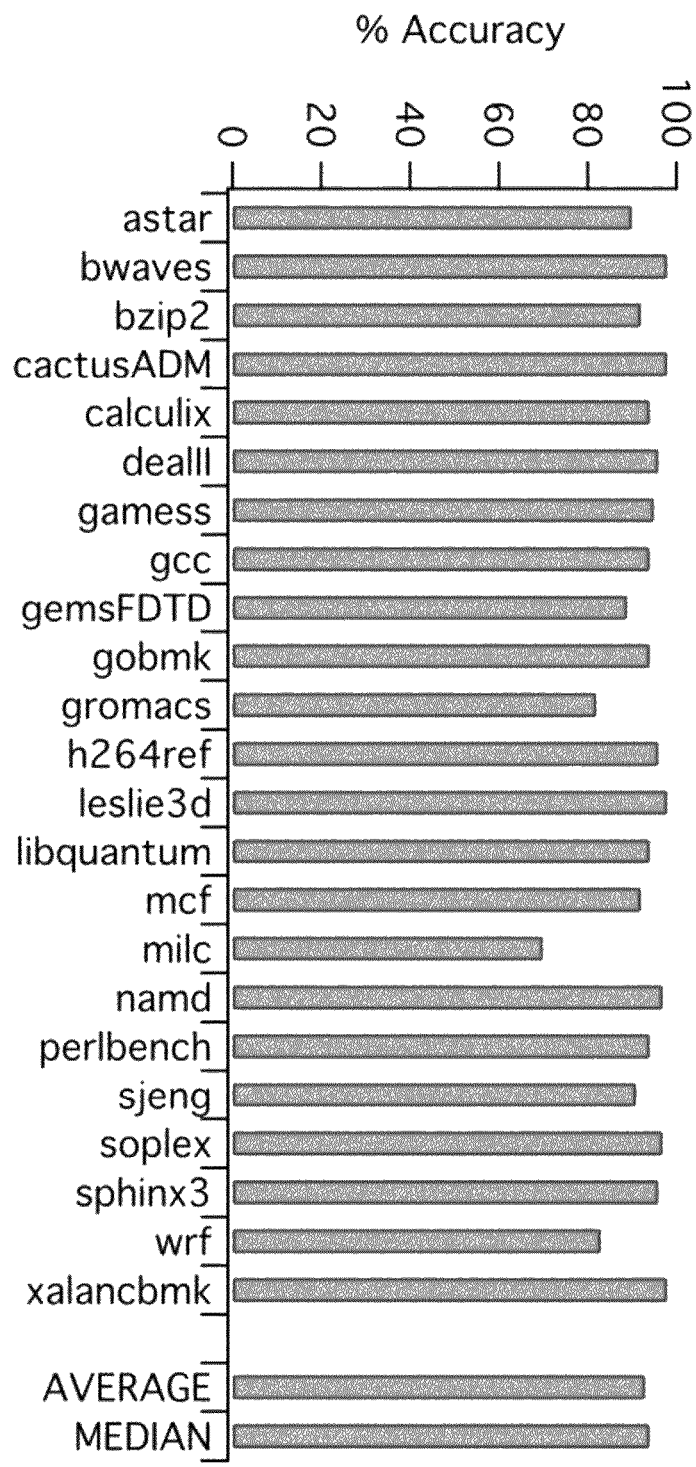
FIGS. 8(a) and (b) are graphs illustrating that a voltage emergency predictor in accordance with a preferred embodiment maintains high prediction accuracy across different (a) program types and (b) power delivery packages and microarchitectural combinations.

Workloads. Applications exhibit different characteristics that drive the machine into different levels of activity and, therefore, varying rates of current draw. FIG. 8(a) plots prediction accuracy across the spectrum of benchmarks from CPU 2006. For benchmarks with multiple inputs, we present the average prediction accuracy across different inputs. The signatures enable high prediction accuracy with an average of 93% and a median of 94%. Voltage emergency signatures are able to handle a range of benchmarks from control-flow-intensive benchmarks like 403.gcc and 400.perlbench to memory-intensive benchmarks like 429.mcf, and to 462.libquantum that exhibit a large number of microarchitectural events such as cache misses. Overall, high prediction accuracy is observed across both the integer and floating-point benchmarks.

Figure 8B:
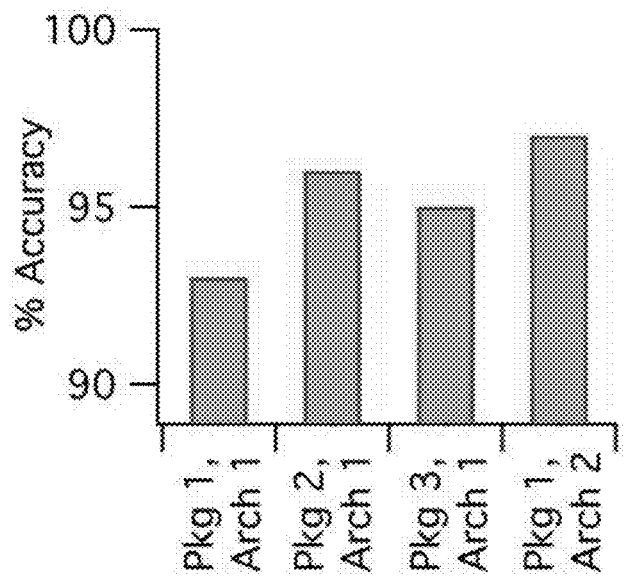
FIG. 8(c) is a graph illustrating that a voltage emergency predictor in accordance with a preferred embodiment of the present invention also is capable of predicting emergencies with sufficient lead time to prevent the emergencies.

Tolerance. FIG. 8(b) shows that when power delivery packages Pkg 1, Pkg 2, and Pkg 3 are paired with the baseline microprocessor design Arch 1 (Table 1), average prediction accuracy remains high (93%, 96%, and 95%, respectively) despite decreasing package quality. Signatures consistently enable emergency prediction with over 90% accuracy without specialization. By comparison, sensor-based schemes require careful configuration of soft thresholds. When package Pkg 1 is paired with a simpler out-of-order processor Arch 2 (one with the same structure as that in Table 1, but with half-sized fetch and decode widths and half-sized buffers, queues, and caches), the accuracy of the present predictor still remains high at 97%.

Figure 8C:
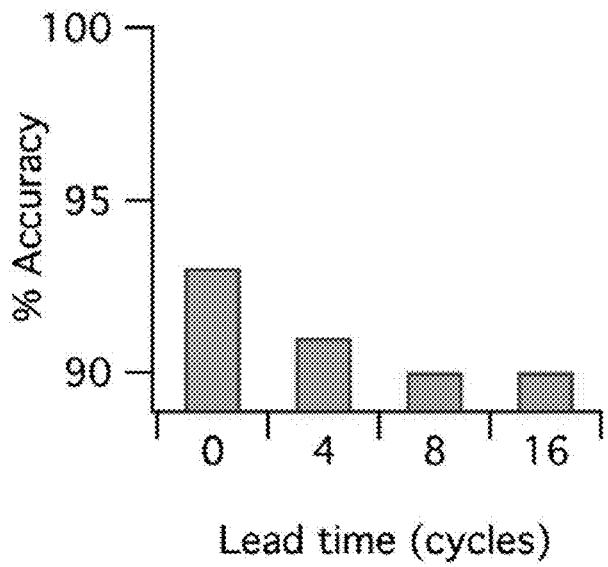

Lead time. Predicting an emergency with sufficient lead time enables the machine to throttle execution and successfully avoid an impending emergency. FIG. 4(b) illustrates this notion of lead time using the Lead time label. Up to this point in the example, it has been assumed that a lead time of 0 cycles to initially validate that signatures are good predictors of emergencies. However, real systems require non-zero lead times to account for circuit delays and allow for throttling to take effect. To experiment with other lead times, trailing segments of the signatures that are captured can be erased. FIG. 8(c) shows accuracy slightly degrades from 93% as lead time increases. However, even with 16 cycles of lead time, ample time to prevent an emergency, prediction accuracy remains high at 90%.

It is important to note that throttling cannot prevent all emergencies even when they are correctly predicted with 16 cycles of lead time. In such cases, the fail-safe mechanism must recover processor state and the machine incurs rollback penalties. However, our experimental data (not shown) verifies that the number of such emergencies is only 1% of the total emergencies that occur without throttling and resulting penalties are very low.

Performance Evaluation

An aggressive reduction in operating voltage margins can translate to higher performance or higher energy efficiency. Since performance and power are inextricably tied, clock frequency performance improvements are demonstrated. Assessing performance also enables straightforward accounting of penalties resulting from throttling and rollbacks. The maximum attainable performance is evaluated within the context of all runtime costs previously illustrated in FIG. 4(a) and compare to a variety of idealized and non-ideal approaches. While the initial analysis makes optimistic assumptions in regards to hardware implementations of the voltage emergency predictor, design tradeoffs are also explored and show a resource-constrained predictor implementation that retains high accuracy and performance improvements.

Designers typically build in conservative margins (guardbands) to safeguard against potentially large voltage droops that can lead to timing violations. Such margins translate to clock frequency reductions and performance loss. Recent papers on industrial designs have shown that 15% to 20% operating voltage margins would be required to protect against voltage emergencies. K. A. Bowman, J. W. Tschanz, N. S. Kim, J. Lee, C. B. Wilkerson, S.-L. Lu, T. Karnik, and V. De. Energy-efficient and metastabilityimmune timing-error detection and instruction replay-based recovery circuits for dynamic variation tolerance. In ISSCC 2008, 2008. Similarly, the present analysis of the baseline example system (Pkg 1 and Arch 1) reveals a worst-case droop of 13%.

The nearly-linear relationship between operating voltage and clock frequency facilitates translation of voltage margin reductions into performance gains. Based on detailed circuit-level simulations of an 11-stage ring oscillator consisting of fanout-of-4 inverters, we observe a 1.5× relationship between voltage and frequency at the PTM 32 nm node. W. Zhao and Y. Cao, "Predictive technology model for sub-45 nm early design exploration," *ACM JETC*. This relationship is consistent with results reported by Bowman et al., which show that a 10% reduction in voltage margins leads to a 15% improvement in clock frequency. While the present example uses this 1.5× voltage-to-frequency scaling factor, a disconcerting trend across technologies is also observed. Simulation results reveal voltage-to-frequency scaling factors of 1.2×, 1.5×, 2.3×, and 2.8× for PTM nodes at 45 nm, 32 nm, 22 nm, and 16 nm, respectively. Given a slowdown in traditional constant-field scaling trends, sensitivity of frequency to voltage is growing, which further stresses the need for techniques that can efficiently reduce voltage noise in future processors.

Based on the 1.5× scaling factor, the 4% operating voltage margin assumed in this paper corresponds to a 6% loss in frequency. Similarly, a conservative voltage margin of 13%, sufficient to cover the worst-case droops observed, leads to 20% lower frequency. Taking this conservative margin as the baseline for comparisons and given that the 13% margin can reduce to 4% while avoiding voltage emergencies, the corresponding clock frequency improvement offers system performance gains of 17.5%.

Comparison of Schemes

To thoroughly evaluate the benefits of using the present signature-based predictor, it is compared to variety of other schemes that also use throttling and/or checkpoint-recovery. A half-rate throttling mechanism that gates every other clock cycle is assumed. For sensor-based schemes, it is assumed that sensors are ideal with zero delay, and can instantly react to either resonant or single-event-based voltage emergencies. For the predictor of the present invention, it is assumed that an unbounded prediction table with a voltage emergency signature predictor with 16 cycle lead time. Calculation of performance gains shown for each scheme begins with the maximum 17.5% gains possible, which then scales down by accounting for all performance overheads. Again, a conservative voltage margin of 13% allows for emergency-free, lower-frequency operation and is the common baseline for all comparisons. Table 0.3 shows the performance gains of all schemes.

TABLE 3

Performance comparison across different flavors of throttling and checkpoint-recovery for handling voltage emergencies.

| Schemes | | Performance Gain (%) |
|---|---|---|
| Predictor throttling | Oracle | 14.2 |
| | Voltage emergency signature | 13.5 |
| | Microarchitectural event | 4.1 |
| Ideal sensor throttling | 2% soft threshold | 2.2 |
| | 3% soft threshold | 9.0 |
| Explicit checkpoint and recovery | | −13.0 |
| Delayed commit and rollback (DeCoR) | | 13.0 |

Oracle predictor. To set an upper bound on the potential benefits of prediction-based schemes, an oracle predictor is considered. It throttles exactly when an emergency is about to occur, and it always prevents the emergency. It does not waste throttles nor does it incur rollback penalties. By removing all voltage emergencies, the resulting performance gain of 14.2%, is the best achievable performance while incurring only 2.9% throttling overhead.

Voltage emergency signature predictor. The signature-based prediction scheme of the present invention incurs performance overhead of 3.5% on average, due to throttling and rollbacks that are needed to detect emergencies and also due to emergencies that throttling cannot avoid. The slightly higher overhead translates to performance gain relative to our baseline of 13.5%, just 0.7% less than the oracle predictor.

Microarchitectural event predictor. A simpler prediction scheme that associates an emergency with the most recent microarchitectural event and the address of the instruction responsible for it is also evaluated. See, M. S. Gupta, V. J. Reddi, M. D. Smith, G.-Y. Wei, and D. M. Brooks, "An event-guided approach to handling inductive noise in processors," DATE, 2009. Whenever that combination recurs, this scheme throttles execution to prevent another emergency. The prediction accuracy of this simple scheme is poor, translating to large amounts of unnecessary throttling that severely degrades performance. Large overheads limit performance gain to only 4.1% with this method.

Figure 2A:
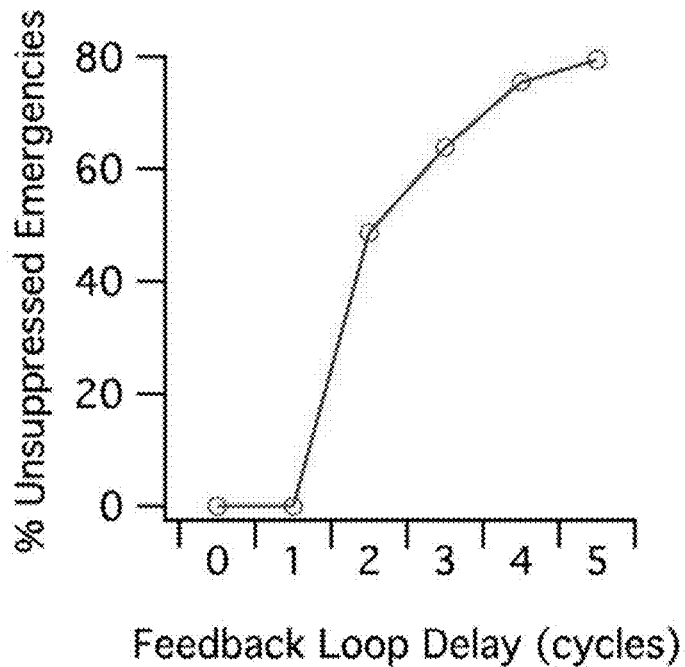
FIG. 2(*a*) is a graph illustrating the sensitivity of sensor-based mechanisms to feedback loops.
Figure 2B:
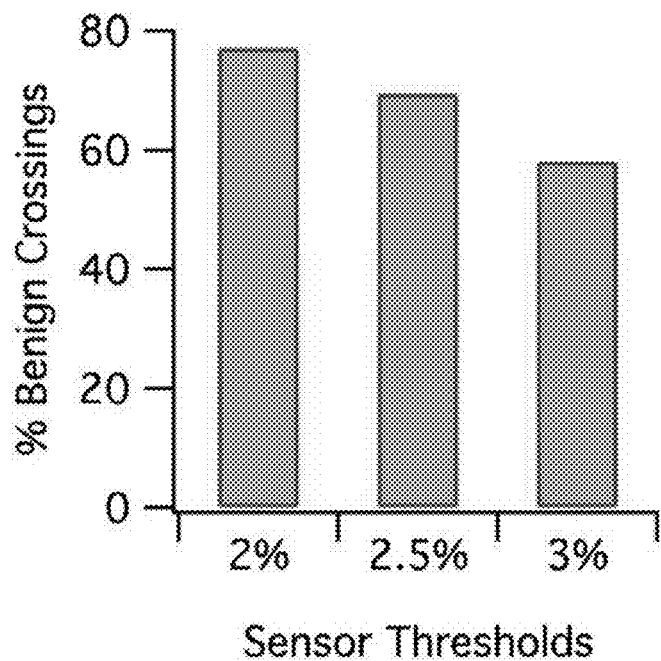

Ideal sensor. Still using a 4% operating margin as the hard lower operating voltage margin, sensor-based schemes are evaluated for two soft voltage threshold settings, a conservative threshold of 2% and an aggressive one of 3%. It is optimistically assumed that a 0-cycle sensor delay and that all emergencies that would occur after crossing the soft threshold are prevented. Note that an actual sensor would have a delay of several cycles and so would give poorer performance results. Despite the optimistic assumptions, performance gains for the 2% and 3% soft thresholds are only 2.2% and 9.0%, respectively. These low gains are due to the high fraction of benign soft threshold crossings that lead to unnecessary throttling penalties, shown earlier in FIG. 2(b).

Explicit checkpoint and recovery. Gupta et al. propose the use of checkpointing specifically for the purpose of handling voltage emergencies. They demonstrate that explicit checkpoint-recovery schemes cannot be directly applied to handling voltage emergencies due to their high rollback costs. The present results confirm their claim. A 13% performance loss when using an explicit checkpoint-recovery mechanism that has a 100-cycle rollback penalty is observed.

Delayed commit and rollback. To overcome limitations of explicit checkpoint-recovery, Gupta et al. propose an implicit checkpointing scheme called DeCoR that speculatively buffers register file and memory updates until it has been verified that no emergency has occurred during a period long enough to detect an emergency. The commit proceeds as usual unless an emergency is detected, in which case the machine rolls back and resumes execution at a throttled pace. A 5-cycle sensor delay is assumed for DeCoR, which represents the best case as demonstrated by its designers.

DeCoR's performance gain is 13.0%, so the signature-based predictor of the present invention outperforms it, but only slightly. However, the benefits of using a signature-based predictor outweigh using DeCoR for a general-purpose processor design. DeCoR's implicit checkpointing requires changes to traditional microarchitectural structures. In comparison, coarsegrained checkpoint-recovery is already shipping in production systems and can serve multiple purposes ranging from boosting processor performance to fault detection and debugging. A signature-based predictor leverages the coarse-grained checkpoint-recovery hardware, thereby retaining all the benefits of coarse-grained checkpoint-recovery while also reducing voltage emergencies.

Issue-rate staggering. Pipeline muffling and a floor-plan aware di/dt controller both stagger issue rates to combat cycle-to-cycle high-frequency noise within individual microarchitectural units. M. D. Pant, P. Pant, D. S. Wills, and V. Tiwari, "An architectural solution for the inductive noise problem due to clock-gating," ISLPED, 1999; F. Mohamood, M. Healy, S. Lim, and H.-H. S. Lee, "A Floorplan-Aware Dynamic Inductive Noise Controller for Reliable Processor Design," MICRO, 2006. In contrast, the present examples consider inductive noise in the mid-frequency (10-100 MHz) range that impacts the entire chip over periods of tens of cycles. Issue-ramping strategies are not suitable for mid-frequency noise because ramping current over such a large number of cycles is not practical; these strategies are thus orthogonal to the present approach.

Proof-of-Concept Implementation

Up to this point it is assumed that unbounded resources are available for matching voltage emergency signatures. In this section, an embodiment of the present invention implementing a resource constrained predictor is shown. The embodiment combines a content-addressable memory (CAM) with a Bloom filter. It is discussed why this combination is more efficient than a CAM or a Bloom filter by itself. Using a 8 KB table, a performance gain of 11.1% is observed, as compared to the 13.5% gain for the unbounded predictor of other embodiments.

Prediction table. A prediction table is a hardware structure for recognizing voltage emergency signatures. Lookups in the prediction table happen whenever the processor updates the contents of the event history register. The processor combines the event sequence from the history register with the address of the last issued branch instruction to form a signature, and then tries to match that signature in the prediction table. If the match succeeds, the processor throttles execution to prevent a potential emergency. It is assumed the prediction table is managed by firmware. When an emergency occurs, the firmware makes a signature by combining the contents of the event history register with the most recently issued branch address and enters it in the prediction table.

CAM. A CAM is a natural structure for implementing a prediction table. However, our analysis shows that at least 8,000 entries would be needed to achieve good performance. At 16 bytes per entry, such a large CAM would require too much area and power. With a smaller CAM, capacity misses could prevent emergencies from being detected, which could lead to severe rollback penalties.

Bloom filter. A Bloom filter is a compact lookup structure that saves space, but may sometimes return a false match. It is a probabilistic hash table that maps keys to boolean values, implemented using a bit vector and k hash functions. The procedure to add a key to the Bloom filter hashes the key k ways and sets the bits in the bit vector corresponding to the k indices returned by the hash functions. A key matches in the Bloom filter if and only if the bits for all k indices hashed from that key are set. With some probability, all of the indices for a key that has never been entered may nevertheless be set, in which case matching that key produces a false positive result.

For the present purposes, false positives can be tolerated because they only affect performance, not correctness. However, a Bloom filter by itself needs to be quite large to give acceptable performance. Smaller Bloom filters have higher false positive rates, and the resulting unnecessary throttling severely degrades performance. While a 64 KB Bloom filter could yield a performance gain comparable to the exemplary unconstrained signature-based predictor, that for a Bloom filter of a more practical size, such as 8 KB, falls to less than 2%.

CAM plus Bloom filter. By screening the anchor PC components of signatures using a CAM, the number of lookups can be reduced in the Bloom filter, which reduces the number of times false positives cause throttling. In the examples it was observed that the working set of anchor PCs is small enough that a CAM is practical. Sizing the CAM appropriately is important, however, because capacity misses allow emergencies to happen, which leads to rollbacks. At CAM sizes of 32 and 64 entries, the results show that rollback penalties reduce performance gains by as much as 50% and 10%, respectively. But with a 128-entry CAM, the performance loss due to capacity misses is negligible.

Thresholds. The other way to reduce false positives is to keep the occupancy of the Bloom filter low. That can be done by excluding the less frequently occurring emergency signatures. The trade-off is that with higher thresholds, more emergencies are missed and more rollback costs are incurred. The firmware that manages the prediction table could at the same time profile signature occurrences and exclude those signatures whose occurrence counts fall below a chosen threshold.

Figure 9A:
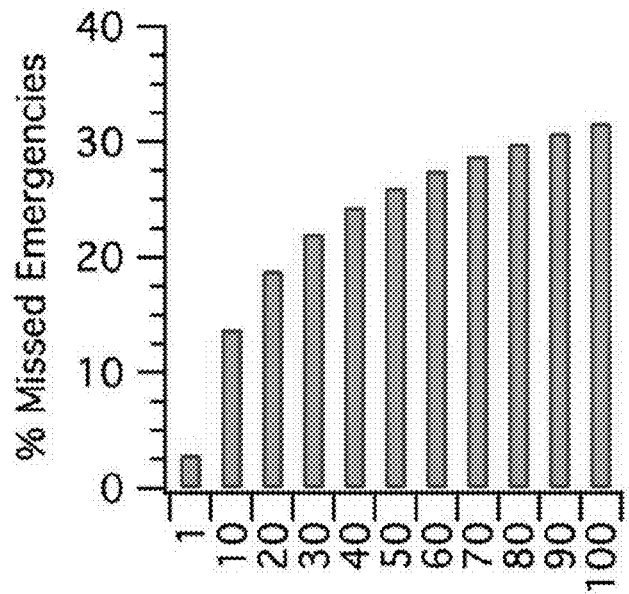
FIGS. 9(a) and (b) are graphs illustrating the effect of threshold value (T) on (a) the fraction of emergencies not handled by the predictor and (b) performance gains when voltage margin is reduced from a conservative 13% to an aggressive 4% setting.

To investigate the effects of thresholds, a prediction table is used combining a 128-entry CAM (one 32-bit address per entry) with a Bloom filter that uses three hash functions. FIG. 9(a) shows that a threshold of one captures all but 2.8% of all emergencies. Larger thresholds cause so many emergencies to be missed that performance degradation due to rollbacks is severe.

Figure 9B:
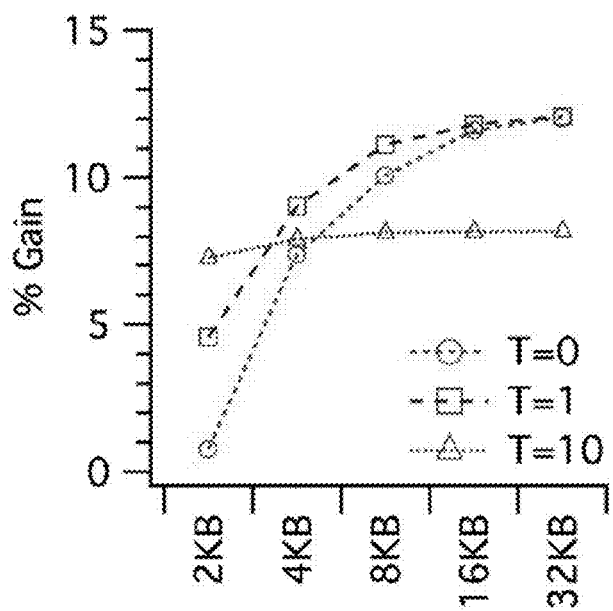

FIG. 9(b) shows the performance gains with different prediction table sizes for a variety of threshold values. For small table sizes, a higher threshold yields better performance because it reduces the false positive rate. With a 2 KB prediction table size, performance gain is only 0.8% without a threshold (T=0). But a threshold of T=10 reduces throttles caused by false positives so much that performance gain increases to 7.3%, despite increased rollback penalties. On the other hand, as table size grows, the false positive rate drops so that lower thresholds are more attractive. With an 8 KB prediction table size, performance gain for a threshold of T=10 is 3 percentage points less than that for a threshold of T=1, because false positives are reduced so much that rollback penalties dominate. With T=1 (which simply excludes all non-recurring emergency signatures), the performance gain for an 8 KB table is 11.1%, as compared to the 13.5% gain for the unbounded prediction table described previously.

With continued technology scaling, the inductive noise problem is an increasingly important design challenge. Several architectural solutions have been proposed in the past to deal with inductive noise in processors. However, these solutions either have trouble guaranteeing correctness or they incur severe performance penalties. The present invention provides a novel voltage emergency predictor that learns to predict recurring voltage emergencies by collecting signatures of the program behavior and processor activity that leads to such emergencies. The predictor-based architecture of the present invention uses the collected signatures to anticipate emergencies and proactively avoid them via throttling, while relying on a checkpoint-restart fall-back scheme already available in today's production systems to train the throttling predictor. The signature-based voltage emergency predictor operates independently of sensor delays, package characteristics, and microarchitecture details, and it enables operation at aggressive voltage margins without compromising correctness. With an aggressive margin of 4%, it can enable a performance gain of as much as 13.5%, compared to 14.2% for an ideal oracle-based throttling mechanism.

Our event-driven mechanism of the present invention triggers corrective action when it detects certain emergency-prone events (L2 cache misses and branch flushes, as they are the events associated with most of the emergencies). A naïve implementation might be to take preventive measures at every such event (for example, to activate a throttling mechanism at every L2 miss). That would be overly conservative, however, since most such events don't give rise to emergencies. Analysis shows a false alarm rate of 71% for such a naïve mechanism. Instead, it tracks specific instructions associated with events (L2 misses or pipeline flushes) that have caused emergencies, and it maintains contextual information for each event and emergency. Reacting only to events associated with emergencies results in much less overhead than the naïve implementation.

The foregoing description of the preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents. The entirety of each of the aforementioned documents is incorporated by reference herein.

What is claimed is:

1. A system for avoiding voltage emergencies comprising:
a microprocessor;
an actuator for throttling said microprocessor;
a voltage emergency detector; and
a voltage emergency predictor comprising:
  means for tracking control flow instructions and microarchitectural events;
  means for storing a plurality of voltage emergency signatures, each said voltage emergency signature being captured in response to a voltage emergency detected by said voltage emergency detector, wherein each stored voltage emergency signature comprises a sequence of control-flow events and microarchitectural events leading up to a detected voltage emergency;

means for comparing current control flow and microarchitectural events with said stored voltage emergency signatures to predict voltage emergencies;

means for actuating said actuator to throttle said microprocessor to avoid predicted voltage emergencies.

2. A system for avoiding voltage emergencies according to claim 1 further comprising:

a checkpoint recovery mechanism for rolling said microprocessor back to a known correct state after said voltage emergency detector detects a voltage emergency.

3. A system for avoiding voltage emergencies according to claim 1, wherein said emergency detector comprises a sensor.

4. A system for avoiding voltage emergencies according to claim 3, further comprising:

a checkpoint recovery mechanism for recovering the system and resuming execution after voltage emergencies.

5. A system for avoiding voltage emergencies comprising:
a microprocessor;
an actuator for throttling said microprocessor;
a sensor for detecting voltage emergencies;
a checkpoint recovery mechanism for recovery and resumption of execution after a voltage emergency occurs; and
a voltage emergency predictor comprising:
means for tracking control flow instructions and microarchitectural events;
means for storing voltage emergency signatures corresponding to voltage emergencies detected by said voltage emergency detector, wherein each stored voltage emergency signature comprises a sequence of control-flow events and microarchitectural events leading up to a previously-detected voltage emergency;
means for comparing current control flow and microarchitectural events with stored voltage emergency signatures to predict voltage emergencies;
means for actuating said actuator to throttle said microprocessor to avoid predicted voltage emergencies.

6. A method for preventing voltage emergencies in a microprocessor comprising the steps of:

tracking control flow instructions and microarchitectural events in said microprocessor;

identifying voltage emergencies that occur in said microprocessor;

storing voltage emergency signatures corresponding to identified voltage emergencies, wherein each voltage emergency signature comprises a sequence of control-flow events and microarchitectural events leading up to a detected voltage emergency;

comparing current control flow and microarchitectural events in said microprocessor with stored voltage emergency signatures to predict impending voltage emergencies; and throttling said microprocessor to avoid said impending voltage emergencies.

7. A method for preventing voltage emergencies in a microprocessor according to claim 6, wherein said step of identifying voltage emergencies comprises detecting execution errors in said microprocessor with a checkpoint recovery mechanism.

8. A method for preventing voltage emergencies in a microprocessor according to claim 7 wherein said step of identifying voltage emergencies further comprises recovery and resumption of execution with said checkpoint recovery mechanism.

9. A method for preventing voltage emergencies in a microprocessor according to claim 6, wherein said step of identifying voltage emergencies comprises detecting a voltage surpassing a threshold.

10. A method for preventing voltage emergencies in a microprocessor according to claim 9 wherein said step of identifying voltage emergencies further comprises recovery and resumption of execution with a checkpoint recovery mechanism.

* * * * *